US009412372B2

(12) United States Patent
Henry et al.

(10) Patent No.: US 9,412,372 B2
(45) Date of Patent: Aug. 9, 2016

(54) METHOD AND SYSTEM FOR AUDIO-VIDEO INTEGRATION

(71) Applicant: SpeakWrite, LLC, Austin, TX (US)

(72) Inventors: Paul Henry, Austin, TX (US); Richard Jackson, Austin, TX (US)

(73) Assignee: SPEAKWRITE, LLC, Austin, TX (US)

( * ) Notice: Subject to any disclaimer, the term of this patent is extended or adjusted under 35 U.S.C. 154(b) by 115 days.

(21) Appl. No.: 13/889,990

(22) Filed: May 8, 2013

(65) Prior Publication Data

US 2013/0304465 A1 Nov. 14, 2013

Related U.S. Application Data

(60) Provisional application No. 61/644,044, filed on May 8, 2012.

(51) Int. Cl.
| | |
|---|---|
| *G11B 27/031* | (2006.01) |
| *G10L 15/26* | (2006.01) |
| *G11B 27/036* | (2006.01) |
| *H04N 9/82* | (2006.01) |

(52) U.S. Cl.
CPC ............ *G10L 15/265* (2013.01); *G11B 27/031* (2013.01); *G11B 27/036* (2013.01); *H04N 9/8233* (2013.01)

(58) Field of Classification Search
CPC . G10L 15/265; G10L 15/22; H04M 2201/40; H04M 2201/60; G06F 17/30746
See application file for complete search history.

(56) References Cited

U.S. PATENT DOCUMENTS

| | | | | | |
|---|---|---|---|---|---|
| 4,646,172 | A | * | 2/1987 | Lemelson | 386/337 |
| 4,884,972 | A | * | 12/1989 | Gasper | 434/185 |
| 5,031,113 | A | * | 7/1991 | Hollerbauer | 704/235 |
| 5,119,474 | A | * | 6/1992 | Beitel et al. | 715/203 |
| 5,136,655 | A | * | 8/1992 | Bronson | 704/270 |
| 5,274,758 | A | * | 12/1993 | Beitel | G06F 17/30017 707/E17.009 |
| 5,649,060 | A | * | 7/1997 | Ellozy et al. | 704/278 |
| 6,185,538 | B1 | * | 2/2001 | Schulz | 704/278 |
| 6,473,778 | B1 | * | 10/2002 | Gibbon | 715/201 |
| 6,516,340 | B2 | * | 2/2003 | Boys | G09B 5/00 709/203 |
| 6,580,790 | B1 | * | 6/2003 | Henry | H04M 3/4931 379/201.01 |
| 6,650,762 | B2 | * | 11/2003 | Gibson et al. | 382/100 |
| 6,766,297 | B1 | * | 7/2004 | Lamer | G06F 17/30011 704/270 |
| 7,366,979 | B2 | * | 4/2008 | Spielberg et al. | 715/230 |
| 7,512,886 | B1 | * | 3/2009 | Herberger et al. | 715/723 |
| 7,600,040 | B1 | * | 10/2009 | Henry | G06F 13/387 709/238 |
| 7,689,898 | B2 | * | 3/2010 | Merril et al. | 715/201 |
| 7,716,054 | B2 | * | 5/2010 | Harris et al. | 704/270 |
| 7,793,230 | B2 | * | 9/2010 | Burns | G06F 17/30864 707/722 |

(Continued)

*Primary Examiner* — Fariba Sirjani
(74) *Attorney, Agent, or Firm* — DuBois, Bryant & Campbell, LLP; William D. Wiese

(57) ABSTRACT

A method of dictation is described which, after transcription, integrates video into text at locations designated by the user. A user collects audio and visual information using an application that has been installed on the user's mobile device. The user designates, using the application, the desired location of the video files within the audio file. Both the audio and video information are uploaded to a transcription provider. The transcription provider uses transcription software to transcribe the audio files into text, the transcription software being able to identify the transcriptionist as to the location within the audio file each video is to be inserted. The transcribed document with integrated audio and video is then delivered back to the user.

12 Claims, 8 Drawing Sheets

(56) References Cited

U.S. PATENT DOCUMENTS

| | | | |
|---|---|---|---|
| 7,844,464 B2* | 11/2010 | Schubert et al. | 704/270.1 |
| 8,036,889 B2* | 10/2011 | Carus et al. | 704/235 |
| 8,140,973 B2* | 3/2012 | Sandquist et al. | 715/719 |
| 8,204,750 B2* | 6/2012 | DeWitt | 704/272 |
| 8,325,883 B2* | 12/2012 | Schultz et al. | 379/52 |
| 8,380,485 B1* | 2/2013 | Callahan | 704/1 |
| 8,570,278 B2* | 10/2013 | Kocienda | G06F 3/04886 345/173 |
| 8,645,134 B1* | 2/2014 | Harrenstien et al. | 704/235 |
| 8,701,145 B1* | 4/2014 | Berger et al. | 725/86 |
| 9,037,461 B2* | 5/2015 | Henry | H04M 3/42221 704/235 |
| 2002/0093591 A1* | 7/2002 | Gong et al. | 348/515 |
| 2002/0172405 A1* | 11/2002 | Schultz | 382/128 |
| 2003/0004724 A1* | 1/2003 | Kahn et al. | 704/260 |
| 2003/0088397 A1* | 5/2003 | Karas et al. | 704/1 |
| 2003/0187642 A1* | 10/2003 | Ponceleon et al. | 704/252 |
| 2003/0200093 A1* | 10/2003 | Lewis et al. | 704/260 |
| 2004/0056883 A1* | 3/2004 | Wierowski | G06F 3/0482 715/719 |
| 2004/0090462 A1* | 5/2004 | Graham | G06F 17/30017 715/767 |
| 2004/0128143 A1* | 7/2004 | Kahn et al. | 704/277 |
| 2004/0143796 A1* | 7/2004 | Lerner | G06F 3/04883 715/234 |
| 2005/0060159 A1* | 3/2005 | Jackson | G10L 15/30 704/275 |
| 2005/0081159 A1* | 4/2005 | Gupta | G06F 17/22 715/751 |
| 2006/0059171 A1* | 3/2006 | Borthakur et al. | 707/100 |
| 2006/0190249 A1* | 8/2006 | Kahn et al. | 704/235 |
| 2007/0067168 A1* | 3/2007 | Grobauer et al. | 704/235 |
| 2007/0150802 A1* | 6/2007 | Wan | G06F 17/241 715/205 |
| 2007/0154190 A1* | 7/2007 | Gilley | G06F 17/30796 386/241 |
| 2007/0174774 A1* | 7/2007 | Lerman et al. | 715/723 |
| 2007/0189708 A1* | 8/2007 | Lerman et al. | 386/52 |
| 2007/0208766 A1* | 9/2007 | Malik | 707/101 |
| 2008/0027726 A1* | 1/2008 | Hansen et al. | 704/260 |
| 2008/0046240 A1* | 2/2008 | Gorodyansky et al. | 704/235 |
| 2008/0155627 A1* | 6/2008 | O'Connor | H04N 7/173 725/109 |
| 2008/0221881 A1* | 9/2008 | Carraux | G10L 15/22 704/235 |
| 2008/0235014 A1* | 9/2008 | Oz | 704/235 |
| 2008/0267504 A1* | 10/2008 | Schloter | G06F 17/30879 382/181 |
| 2009/0210778 A1* | 8/2009 | Kulas | G06Q 10/107 715/201 |
| 2009/0287487 A1* | 11/2009 | Rossman et al. | 704/235 |
| 2009/0327856 A1* | 12/2009 | Mouilleseaux | G06F 17/30781 715/230 |
| 2010/0056876 A1* | 3/2010 | Ellis et al. | 600/300 |
| 2010/0211617 A1* | 8/2010 | Jain | G06F 17/30038 707/812 |
| 2010/0305726 A1* | 12/2010 | Lu et al. | 700/94 |
| 2011/0119058 A1* | 5/2011 | Berard et al. | 704/235 |
| 2011/0246172 A1* | 10/2011 | Liberman et al. | 704/2 |
| 2012/0245936 A1* | 9/2012 | Treglia | G06F 17/30746 704/235 |
| 2012/0300080 A1* | 11/2012 | Batson | H04N 9/3141 348/159 |
| 2012/0323590 A1* | 12/2012 | Udani | G06Q 10/103 705/2 |
| 2013/0024208 A1* | 1/2013 | Vining | 705/3 |
| 2013/0041892 A1* | 2/2013 | Bayer | G06F 17/30755 707/722 |
| 2013/0054636 A1* | 2/2013 | Tang | 707/769 |
| 2013/0066623 A1* | 3/2013 | Chou et al. | 704/2 |
| 2013/0073981 A1* | 3/2013 | Pea | G06F 17/30014 715/751 |
| 2013/0145269 A1* | 6/2013 | Latulipe | G06F 3/048 715/720 |
| 2013/0304465 A1* | 11/2013 | Henry et al. | 704/235 |
| 2015/0066528 A1* | 3/2015 | Kieckens | G06F 19/3487 705/2 |

\* cited by examiner

METHOD AND SYSTEM FOR AUDIO-VIDEO INTEGRATION

CROSS-REFERENCE TO RELATED APPLICATIONS

This non-provisional application claims priority based upon prior U.S. Provisional Patent Application Ser. No. 61/644,044 filed May 8, 2012 in the names of Paul Henry and Richard Jackson entitled "Smartphone Photo-Transcription Integration," the disclosure of which is incorporated herein in its entirety by reference as if fully set forth herein.

BACKGROUND OF THE INVENTION

Dictation and transcription systems known in the art have a number of shortcomings. For example, existing systems do not allow for a user to dictate audio information into a mobile device, add video in specific locations, upload that resulting recorded audio and video to an offsite transcriptionist to be transcribed with the video inserted in the proper locations so that, after transcription, the completed, transcribed audio and video file is delivered to the user, or to a location designated by the user.

There is a need, therefore, for a dictation and transcription system that allows for the efficient capture of audio and video files through an application on a mobile device, with the corresponding ability to send the files to a transcription provider who can effectively integrate the video files with the audio files as intended by the user.

SUMMARY OF THE INVENTION

This invention includes the ability to capture audio and video from a mobile device, to provide the audio and video to an offsite transcription provider, and to include the videos in the transcription provided by the transcription provider at the locations designated by the user. More specifically a user collects audio and visual information using an application that has been installed on the user's mobile device. The user designates, using the application, the desired location of the video files within the audio file. Both the audio and video information are uploaded to the transcription provider. The transcription provider uses transcription software to transcribe the audio files to text, the transcription software being able to identify the transcriptionist as to the location within the audio file each video is to be inserted. The transcribed document with integrated text and video is then delivered back to the user.

The foregoing has outlines rather broadly certain aspects of the present invention in order that the detailed description of the invention that follows may better be understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is directed to improved methods and systems for, among other things, the integration of video into a transcription during dictation. The configuration and use of the presently preferred embodiments are discussed in detail below. It should be appreciated, however, that the present invention provides many applicable inventive concepts that can be embodied in a wide variety of contexts other than photo-transcription integration. Accordingly, the specific embodiments discussed are merely illustrative of specific ways to make and use the invention, and do not limit the scope of the invention. In addition, the following terms shall have the associated meaning when used herein:

"application" includes a software application which is installed on, or downloaded to, a mobile device, including an application that provides instruction to the mobile device on the collection, storage and transmission of audio and video files;

"mobile device" can include a personal digital assistant (PDA), smart phone, and/or other types of portable devices generally known to those skilled in the art that can be communicatively connected to a wired or wireless network, including a wi-fi network or a cellular telephone network;

"transcription provider" includes any person or entity who provides a service wherein audio and video content is collected from a user and made available for electronic or manual transcription;

"transcription software" includes software that allows the transcriptionist to combine the audio and video into an electronic document; and "video" includes pictures, drawings, graphics, video and any other visual content.

Before a user commences dictating, the user invokes a particular application preinstalled on a mobile device. The application allows the user to record audio and add pictures at locations within the audio. Then the user then submits the audio and video to the transcription provider.

Figure 1:
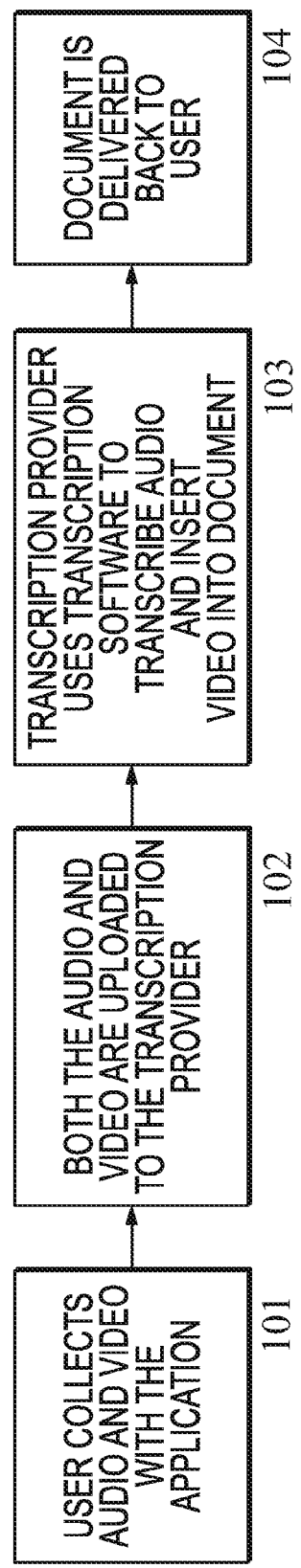
FIG. 1 depicts an exemplary audio-video integration process according to one embodiment of the present invention.

Referring now to FIG. 1 which depicts an exemplary integration process according to one embodiment of the present invention in which a user collects audio and visual information using the application 101. Both the audio and visual information are uploaded to the transcription provider's servers 102. The transcription provider uses transcription software to transcribe the audio files and to insert the corresponding video files when and where applicable into an electronic document 103. The electronic document is then delivered back to the user 104.

Figure 2:
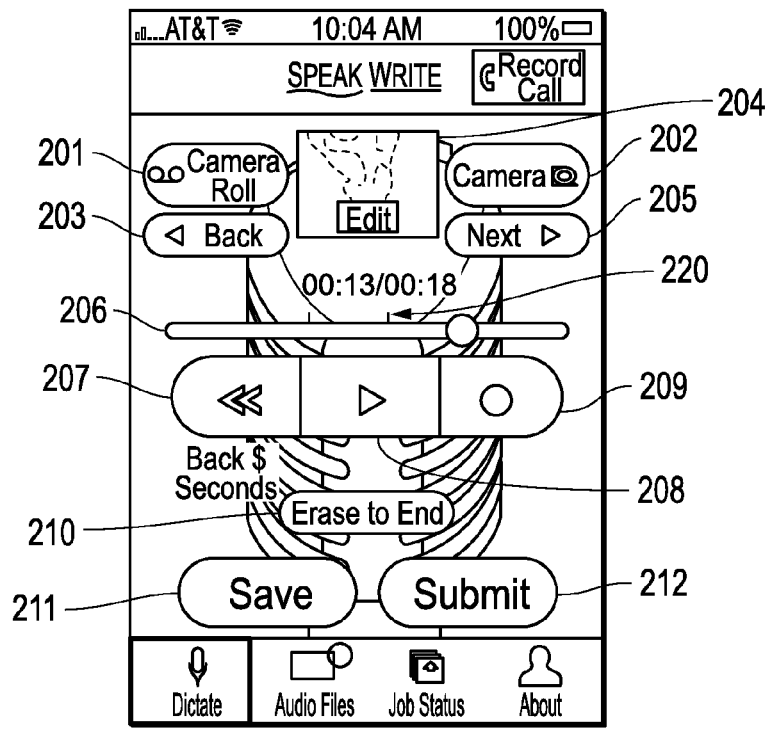
FIG. 2 is a screen shot of the main screen of one embodiment of the application of the present invention.

Referring now to FIG. 2, wherein one embodiment of a main screen of an application of the present invention is depicted. The device may have a touch sensitive display, an audio conversion module, a microphone, and network connectivity technology. The touch-sensitive display may display graphical user interfaces which include interactive content, such as the buttons described in more detail below, and non-interactive content. The microphone may include acoustic-to-electric transducers that convert sound waves into one or more electrical signals. For example, the microphone may convert an electrical signal corresponding to a sound wave into a digital representation that may be stored as an audio file on a computer.

Figure 3:
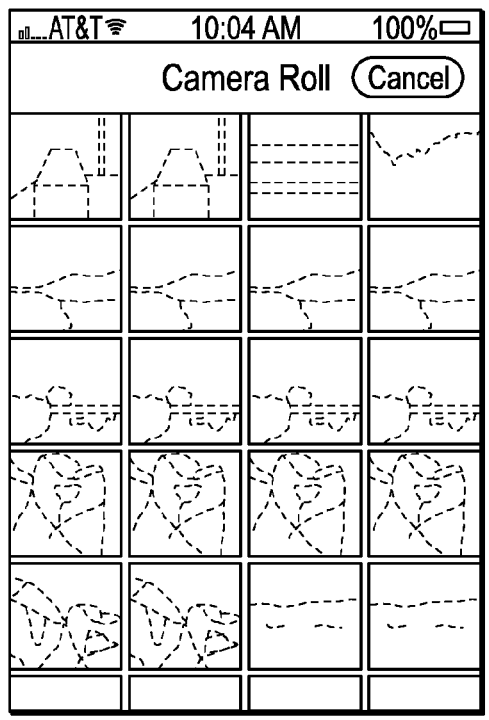
FIG. 3 is a screen shot of the camera roll of one embodiment of the application of the present invention.
Figure 4A:
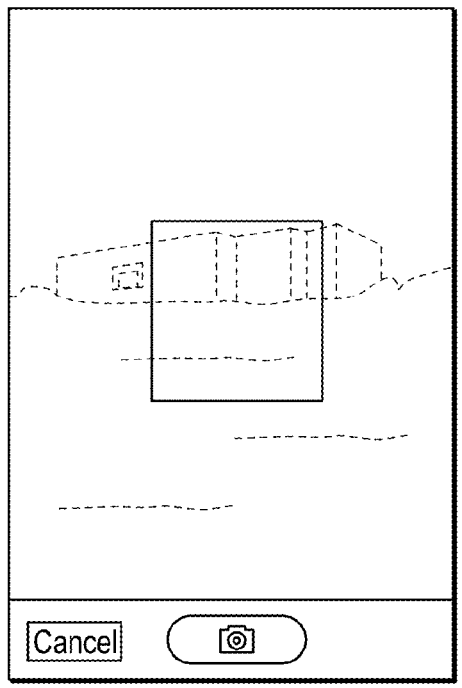
FIGS. 4A and 4B are screen shots of the camera viewfinder of one embodiment of the application of the present invention.
Figure 4B:
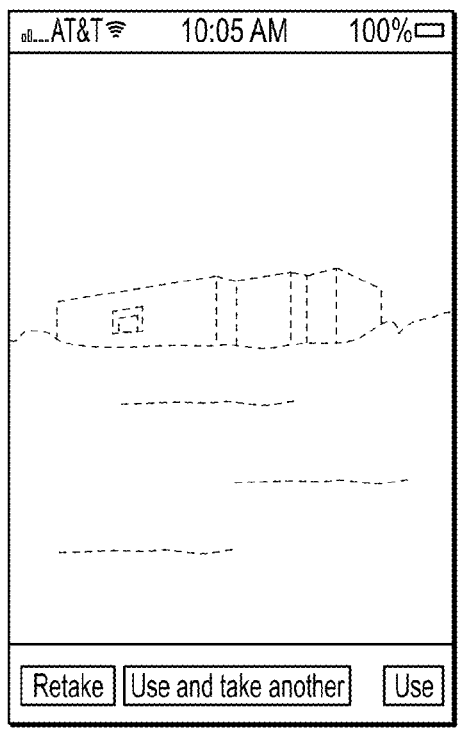
Figure 5:
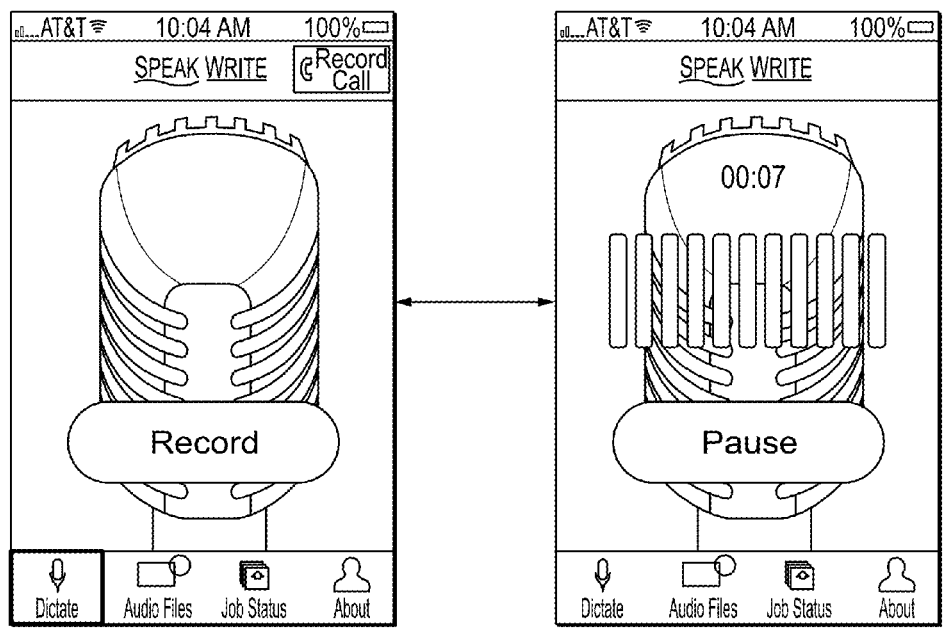
FIG. 5 shows screen shots of the record and pause screens of one embodiment of the application of the present invention.

A user using the application is presented with the play 208 and record 209 buttons found in other dictation applications known in the art. However, the user is also presented with a camera roll button 201 and a camera button 202 which allow the integration of video into the audio stream. When the user activates the camera roll 201 button, the user is presented with the camera roll resident on the mobile device and the user is allowed to select an existing video using methods known in the art. An example of how the camera roll screen looks in some embodiments is shown on FIG. 3. Once a video is selected by the user, the video is inserted at the current location within the audio file and the user is returned to the main screen. The location of the video within the audio file is designated by a hash mark 220 on the audio slide bar 206.

Similarly, when the user selects the camera button 202, the user is allowed to take a picture or video with the mobile device. Once a picture or video is taken by the user, the video is inserted at the current location within the audio file and the user is returned to the main screen. Once again, the location of the picture or video within the audio file is designated by a hash mark 220 on the audio slide bar 206.

Referring now back to FIG. 2, showing a audio slide bar 206 and a picture preview window 204. The user can move the audio slide bar 206 to jump to different positions within the audio file. The hash mark indicates the location within the audio file in which the video was placed. As the user moves along the audio slide bar the picture associated with the corresponding portion of the audio is displayed in the picture preview window 204. The picture or video in the picture preview window 204 will change to the picture at the current audio location. Thus, the user can easily scrub back and forth along the audio slide bar 206 while watching the video preview window 204 to see which video is associated with the corresponding portion of audio.

If the user wants to edit the picture associated with any portion of the audio, the user can click the "edit" button in the picture preview window 204. This allows the user to change the current picture with a new picture from the camera roll, or from a new photo taken from the mobile device's camera.

When the user wants to record additional audio, the user activates the record button 209, whereupon audio will be recorded commencing at the current location on the audio slide bar 206.

The main screen of the application also includes features that would be useful in navigating the recording and storage of audio and video files, including a picture back button 203 that allows the user to jump to the previous picture and changes the audio position of the audio slide bar 206 to the location at which the picture shown in the picture preview window was inserted and a picture next button 205 that allows the user to jump to the next picture and changes the audio position of the audio slide bar 206 to the location at which the picture shown in the picture preview window was inserted.

Figure 6:
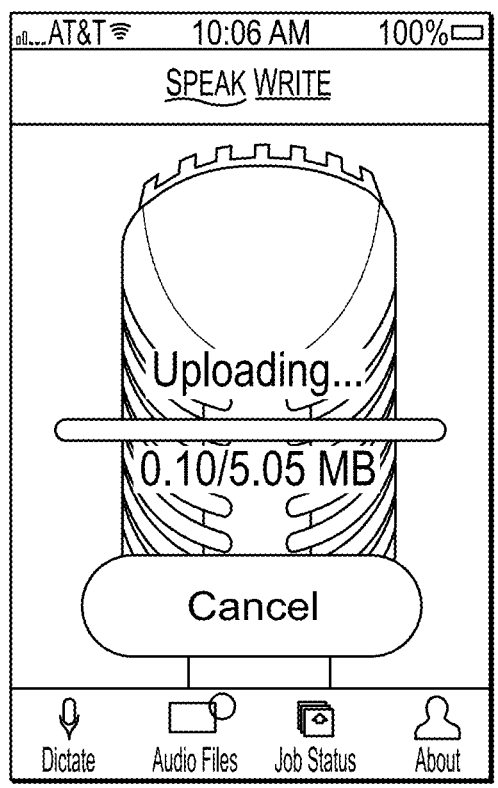
FIG. 6 is a screen shot of the uploading of one embodiment of the application of the present invention.

Also, the application provides the user with traditional audio recording controls including a back 5 button 207, play button 208, record button 209, erase to end button 210 (which erases any audio from the current position to the end of the recording), and a save button 211. In addition, the main screen includes a submit button 212 which, when activated, uploads the audio and video files to the transcription provider as shown in FIG. 6

Figure 7:
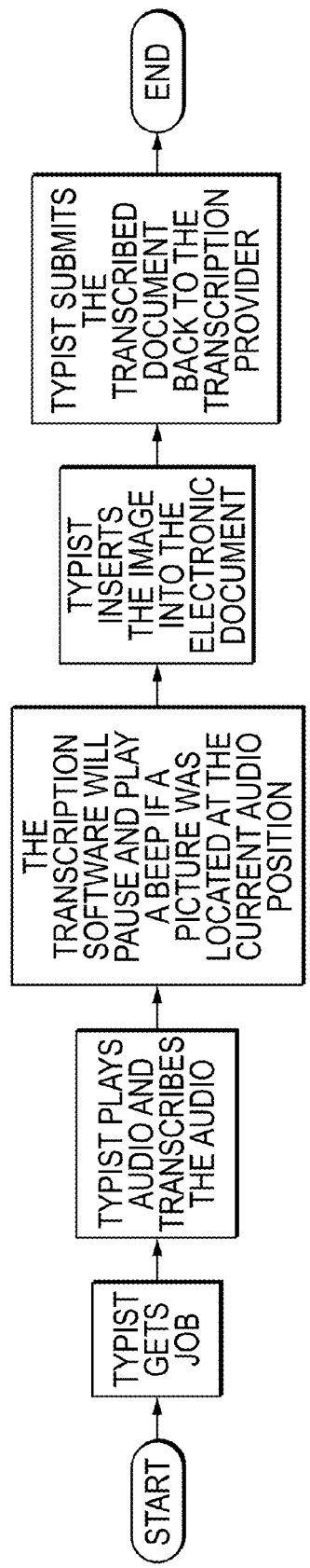
FIG. 7 depicts an exemplary transcription process according to the one embodiment of the present invention.

In some embodiments of the invention, after the audio and video files have been uploaded to the transcription provider, the files are provided to a transcriptionist for transcription. The transcription software allows the transcriptionist to listen to the audio and insert pictures into an electronic document. As generally shown in FIG. 7, a transcriptionist receives a job, the transcriptionist listens to the audio file and transcribes the job. At the point in the audio where the user inserted a video, the transcription software plays a beep, thereby alerting the transcriptionist to insert the video. After inserting the video, the transcriptionist continues transcribing the audio file until the entire integrated audio/video file is completed.

Figure 8:
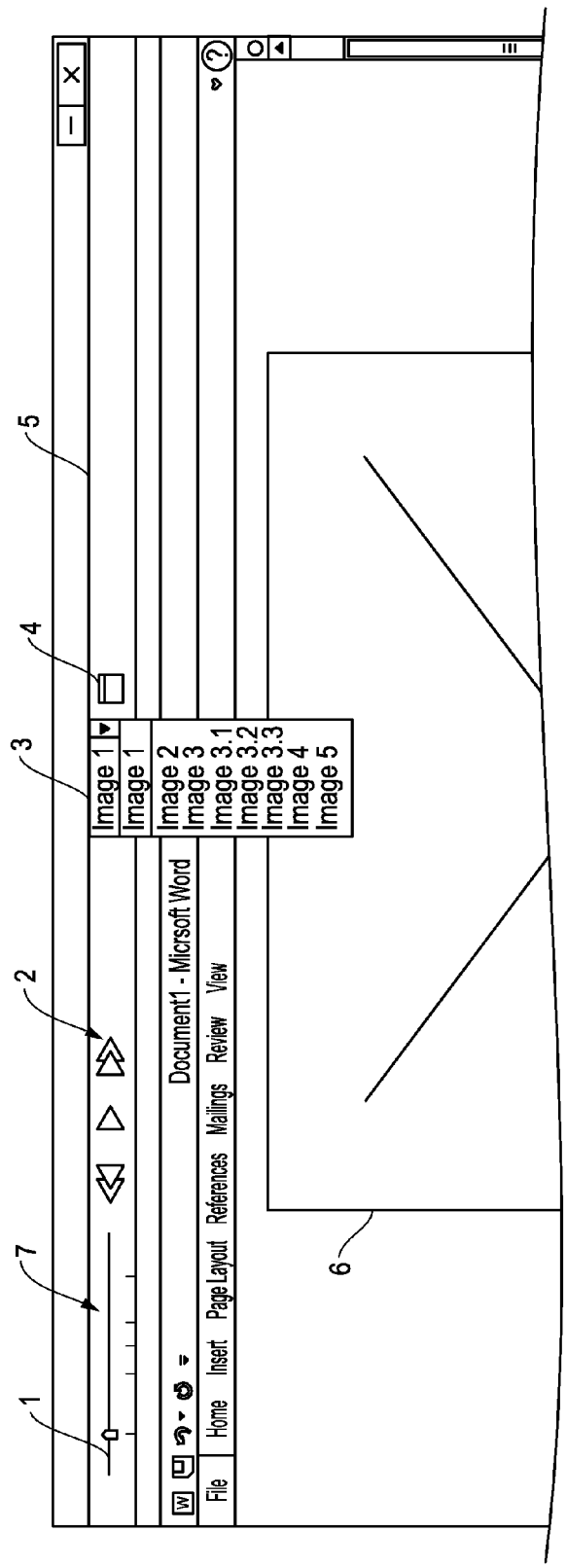
FIG. 8 shows the top half of a screen shot showing transcription software functionality in one embodiment of the present invention.

FIG. 8 shows the upper half of a screen shot of one embodiment of the transcription software. Audio bar 1 indicates the current location in the audio file to the transcriptionist and allows the transcriptionist to jump to different sections within the audio. Hash marks 7 show the transcriptionist where videos are to be inserted within the audio file. Audio controls 2 allow the transcriptionist to play and pause the audio as well as navigate forwards or backwards within the audio file.

The transcription software also may include an image dropdown feature 3 which identifies all the pictures associated with the audio file, an insert image button 4 which inserts the image at the current location, and a skip feature 5 which allows the transcriptionist to listen to the audio without the transcription software pausing at picture locations.

Figure 9:
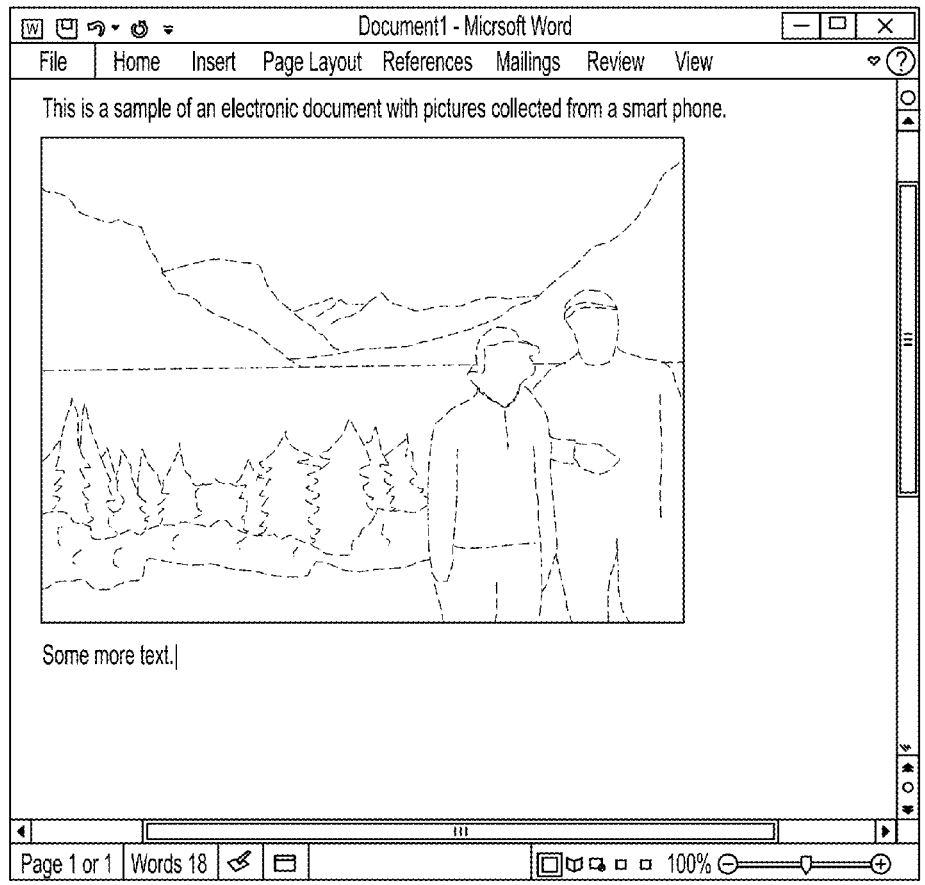
FIG. 9 shows a transcribed document integrating text and video.

As shown in FIG. 9, after the transcriptionist has uploaded the electronic document, it is delivered back to the user. In some embodiments, clicking on the picture within the completed document will navigate to a web page showing the location where the picture was taken.

While the present system and method has been disclosed according to the preferred embodiment of the invention, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the invention to those particular embodiment configurations. These terms may reference the same or different embodiments, and unless indicated otherwise, are combinable into aggregate embodiments. The terms "a", "an" and "the" mean "one or more" unless expressly specified otherwise. The term "connected" means "communicatively connected" unless otherwise defined.

When a single embodiment is described herein, it will be readily apparent that more than one embodiment may be used in place of a single embodiment. Similarly, where more than one embodiment is described herein, it will be readily apparent that a single embodiment may be substituted for that one device.

In light of the wide variety of transcription methods known in the art, the detailed embodiments are intended to be illustrative only and should not be taken as limiting the scope of the invention. Rather, what is claimed as the invention is all such modifications as may come within the spirit and scope of the following claims and equivalents thereto.

None of the description in this specification should be read as implying that any particular element, step or function is an essential element which must be included in the claim scope. The scope of the patented subject matter is defined only by the allowed claims and their equivalents. Unless explicitly recited, other aspects of the present invention as described in this specification do not limit the scope of the claims.

What is claimed is:

1. A method for integrating video into a transcribed document, the method being performed by a mobile device in communication with a server of a transcription provider, the method comprising;
    providing an application for use on the mobile device, wherein said application is configured so that a user records audio to an audio file, selects video, and designates a location within said audio file at which said video is associated;
    receiving two or more video segments from said user on the mobile device;
    receiving said audio file from said user on the mobile device;
    playing back said audio file to said user by the mobile device;
    receiving, from said user, on the mobile device, and during the playing back of said audio file, one of the two or more video segments to obtain said video;
    presenting to said user a graphical user interface depicting an audio slide bar configured to receive input designating a location within said audio file at which said video is to be associated;
    receiving, from said user on the audio slide bar and during the playing back of said audio file, a designation of the location within said audio file at which said video is associated;
    uploading said audio file, said video, and said location information from the mobile device to the server;
    wherein a transcriptionist transcribes said audio file from the server to text by use of a transcription software that displays a further audio bar indicating a current location within said audio file and depicting the location at which said video is associated with a representative image from said video; and
    receiving, on the mobile device, one or more transcriptions of said audio file in which said video is integrated into said text at said location designated by said user.

2. The method of claim 1, wherein said application is downloaded and installed by said user prior to use.

3. The method of claim 1, wherein said recording utilizes said mobile device's integral microphone.

4. The method of claim 1, wherein said video is a photograph.

5. The method of claim 1, wherein the graphical user interface of the mobile device is configured to designate locations within said audio file, at which the two or more video segments are associated, by presenting hash marks along the audio slide bar.

6. The method of claim 1, wherein a graphical user interface, of the server, is configured to designate locations within said audio file, at which the two or more video segments are associated, by presenting hash marks along the further audio slide bar.

7. A system for integrating video into a transcribed document, comprising;
    a mobile device for use by a user; and
    a server belonging to a transcription provider, in communication with the mobile device, and being used by a transcriptionist;
    wherein the mobile device includes an application resident on the mobile device;
    wherein said application is configured so that a user records audio to an audio file, selects video, and designates a location within said audio file at which said video is associated;
    wherein said application is configured to perform the following on the mobile device:
        receive two or more video segments from said user;
        receive said audio file from said user;
        play back said audio file to said user;
        receive, from the user and during the play back of said audio file, a selection of said video as one of the one or more video segments;
        present to the user a graphical user interface depicting an audio slide bar configured to receive input designating a location within said audio file at which said video is to be associated;
        receive, from said user on the audio slide bar and during the play back of said audio file, a designation of the location within said audio file at which said video is associated;
    wherein said audio file and said video are uploaded from said mobile device of the user to the server;
    wherein the server further includes transcription software configured to display, to the transcriptionist, a further audio bar indicating a current location within said audio file and depicting the location at which said video is associated with a representative image from said video; and
    wherein the mobile device receives, from the server, and displays, at the mobile device, one or more transcriptions of said audio file in which said video is integrated into said text at said location designated by said user.

8. The system of claim 7, wherein said application is downloaded and installed by said user prior to use.

9. The system of claim 7, wherein said recording utilizes said mobile device's integral microphone.

10. The system of claim 7, wherein said video is a photograph.

11. The system of claim 7, wherein the graphical user interface, of the mobile device, is configured to designate locations within said audio file, at which the two or more video segments are associated, by presenting hash marks along the audio slide bar.

12. The system of claim 7, wherein a graphical user interface, of the server, is configured to designate locations within said audio file, at which the one or more videos are associated, by presenting hash marks along the further audio slide bar.

* * * * *